Patented Feb. 22, 1927.

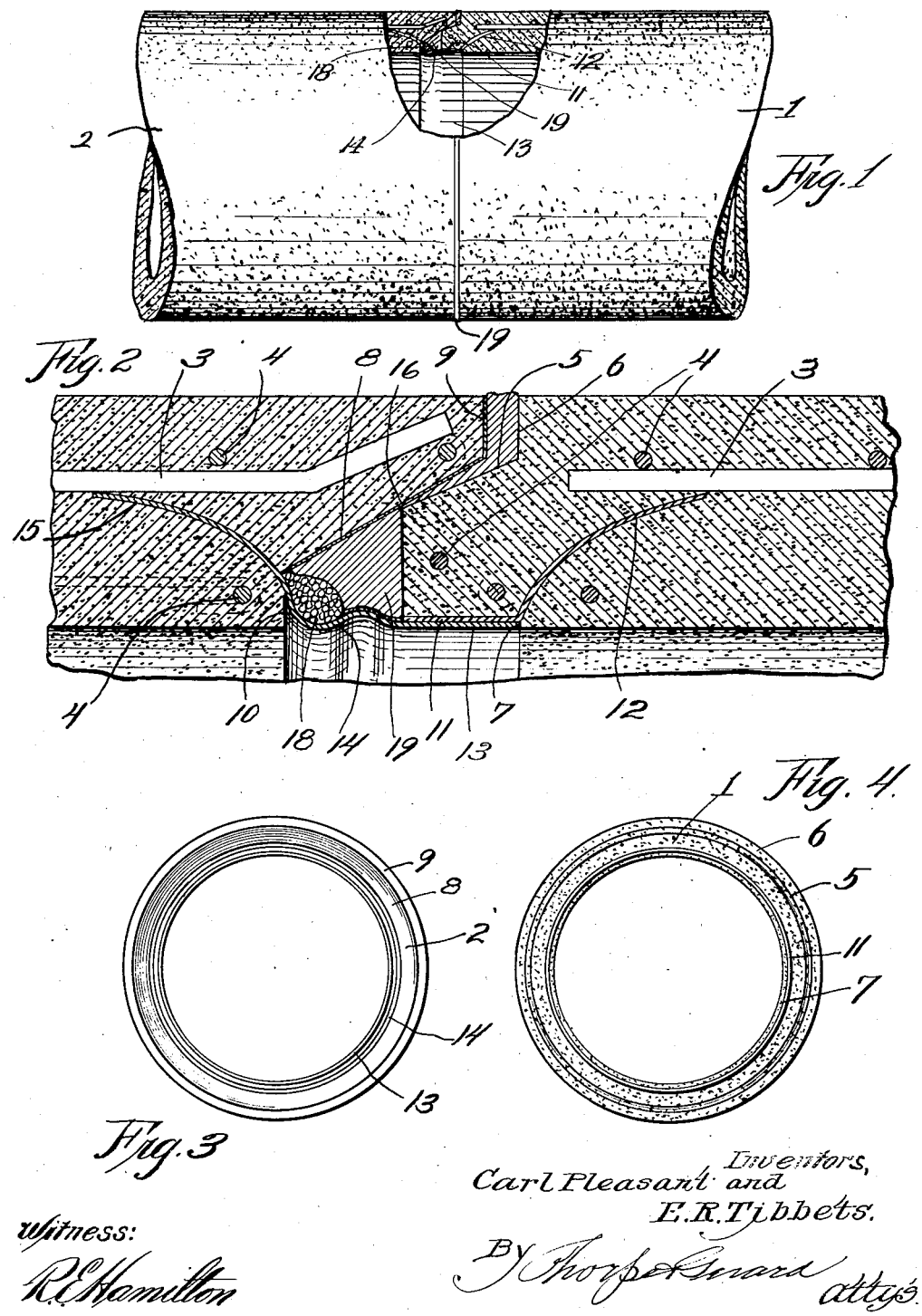

1,618,472

UNITED STATES PATENT OFFICE.

CARL PLEASANT AND ERNEST R. TIBBETS, OF TULSA, OKLAHOMA.

PIPE JOINT.

Application filed November 19, 1923. Serial No. 675,571.

This invention relates to concrete pipe joints and has for one of its objects to produce an absolutely leak-proof joint for use primarily in concrete pipes carrying liquid under pressure and for other uses when found desirable.

Another object is to produce a pipe joint which obviates the use of the ordinary caulking with lead, cement or other material which has been found to weaken and develop leaks under expansion and contraction of the pipes.

With the objects named in view, the invention consists in certain novel and useful features of construction and organization of parts as hereinafter described and claimed; and in order that it may be fully understood, reference is to be had to the accompanying drawing, in which:—

Figure 1 is a side elevation of a pair of abutting pipes, parly broken away to illustrate the joint of the invention.

Figure 2 is an enlarged central vertical section taken through a concrete pipe joint embodying the invention.

Figure 3 is an end view of the female end of a pipe section.

Figure 4 is an end view of the male end of a pipe section.

In the said drawing, where like reference characters identify corresponding parts in all of the figures, 1 and 2 respectively indicate the male and female ends of a pair of pipe sections, said sections, when made of concrete, being suitably reinforced to withstand the internal pressure of a liquid by means of longitudinally and circumferentially extending rods 3 and 4. The exact construction of the pipe sections, however, is immaterial to this invention.

The male end of each pipe is formed with an inclined face 5, an external shoulder 6 and an internal shoulder 7. The female end of each pipe is formed with an inclined face 8 of somewhat greater length and depth than the corresponding face 5 of the male end, an external shoulder 9, and an internal shoulder 10.

Secured in the male end of the pipe at the time said pipe is poured and fitting flatly within the pipe above the internal shoulder 7 is a ring of lead, zinc or any other suitable material, said ring 11 being formed integrally with a dome-shaped flange 12 which is embedded in the concrete of the pipe, and through its shape, as will be apparent, will effectually resist longitudinal movement of the ring in either direction.

Secured to the female end of a pipe section is a ring 13 adapted to be received within the ring 11 of the male end of an adjacent pipe, said ring 13 being formed with a compound curved portion 14, hereinafter particularly referred to. The ring 13 is securely maintained in position in the end of its pipe section by means of a dome-shaped flange 15 molded in the concrete at the time of pouring, as described in connection with the flange 12.

In use the female end of the pipe and the exposed part of the ring 13 are painted with suitable asphaltic or other paint 16 for a purpose which will hereinafter appear, and a ring or packing 18 of jute or the like is wrapped around the ring within the curve 14 and adjacent the end of the pipe 2. The male end of the abutting pipe is now engaged within the female end of the adjacent pipe, the ring 13 of the latter being received within the ring 11 of the male end of the pipe and being brought into abutment with the shoulder 7 of said pipe 1, and the two rings are soldered or otherwise permanently secured together to form a liquid-tight joint.

A cement grout 19 is now poured into the joint between the shoulders 5 and 9, the end of the pipe 1 being sufficiently rough or uneven to permit the cement to enter the cavity behind the jute packing 18 and fill the space above the ring 13, it being evident that the cement will strongly adhere to the uncoated male end of the pipe while it will not adhere to the asphaltic-painted female end.

It will be apparent from a consideration of the drawing that the cement grout is not depended upon to seal the joint, but merely acts as a backing for the compressible packing 18.

It will also be evident that upon the contraction of the pipe sections, the lead rings will not be subjected to direct stretch, but such movement will be taken up through a slight compression of the jute packing, the concrete grout adhering to and bodily moving with the male end of the pipe and continuously backing up and reinforcing the packing.

From a consideration of the drawing and description, it will be obvious that the purpose of the jute ring is merely to act as a yielding backing for the lead ring, thus allowing the ring at this point to bend outwardly to allow for a contraction or drawing away of the ends of adjacent pipe sections, the ring merely bending slightly and exerting a greater compression on the packing. When the pipes expand, the packing will also expand to prevent the formation of a pocket between the ring and the packing.

From the above description, it will be apparent that we have produced a liquid-tight joint embodying all of the features of advantage pointed out as desired; and while we have described and claimed the preferred embodiment of the same, we reserve the right to make all changes properly falling within the spirit and scope of the appended claims.

We claim:—

1. A pipe joint comprising a pair of pipe sections, one having an end chamber and the other a reduced end fitting part way into said chamber, a ring of soft metal fitting and secured in the bore of the section having the reduced end, a ring fitting telescopically in the first-named ring and welded thereto with a liquid-tight relation, the second ring being secured to the first-named section and extending longitudinally of the chamber therein and corrugated beyond the outer ring and between the bottom of the said chamber of said section and the opposing face of the said reduced end of the other section, a packing of compressible material encircling and engaging the externally corrugated portion of said second or inner ring, and a filling of unyielding material for the said chamber engaging said packing to apply increasing pressure endwise and inwardly thereon under contracting action of the pipe sections, the filling being affixed to the member having the reduced end and bearing a detachable relation to the chambered member.

2. A pipe joint comprising a pair of pipe sections, one having an end chamber and the other a reduced end fitting part way into said chamber, a ring of soft metal fitting and secured in the bore of the section having the reduced end, a ring fitting in the first-named ring and welded thereto with a liquid-tight relation, the second ring being secured to the first-named section and corrugated beyond the outer ring and between the bottom of said chamber of said section and the opposing face of the said reduced end of the other section, a packing of compressible material encircling and engaging the externally corrugated portion of said second or inner ring, and a filling of unyielding material for the said chamber engaging said packing to apply increasing pressure endwise and inwardly thereon under contracting action of the pipe sections, the said unyielding filling being permanently united to the section having the projection and in mere abutting relation to the wall of the chamber of the other member and the exterior surface of the corrugated ring where the same is exposed between the packing and the other or first-named ring.

In witness whereof we hereunto affix our signatures.

CARL PLEASANT.
E. R. TIBBETS.